United States Patent [19]

Onishi

[11] 4,231,717
[45] Nov. 4, 1980

[54] ENGINE DRIVE TYPE GENERATOR BLOWER

[75] Inventor: Sigeru Onishi, Kanazawa, Japan

[73] Assignee: Toyota Jidosha Kogyo Kabushiki Kaisha, Toyota, Japan; a part interest

[21] Appl. No.: 950,082

[22] Filed: Oct. 10, 1978

[30] Foreign Application Priority Data

Oct. 11, 1977 [JP] Japan .................... 52-120896

[51] Int. Cl.³ .................... F26B 19/00; F04B 35/00
[52] U.S. Cl. .................... 417/364; 417/371; 165/51; 126/19.5
[58] Field of Search .......... 417/364, 371, 411, 313; 126/19.5; 34/86; 165/51

[56] References Cited

U.S. PATENT DOCUMENTS 3,514,219  5/1970  Mitchell et al. .............. 417/313 X
4,003,139  1/1977  Van Winkel .................. 126/19.5

*Primary Examiner*—Richard E. Gluck
*Attorney, Agent, or Firm*—Stevens, Davis, Miller & Mosher

[57] ABSTRACT

Disclosed is an engine drive type generator blower comprising a generator directly connected to the output shaft of the engine, and a blower directly connected to the rotary shaft of the generator. The engine is enclosed by a stationary duct having on its forward end a cold air inlet. A catalytic converter for purifying the exhaust gas is arranged in the stationary duct. The air inlet opening of the blower is enclosed by a rotary duct which can be connected to the stationary duct. When the rotary duct is connected to the stationary duct, hot air is discharged from the blower. When the rotary duct is directly opened into the atmosphere, cold air is discharged from the blower.

7 Claims, 7 Drawing Figures

ENGINE DRIVE TYPE GENERATOR BLOWER

DESCRIPTION OF THE INVENTION

The present invention relates to a generator blower driven by a internal combustion engine.

In a case where construction or other type of work is carried out in a manhole, or other similar type of closed area, it is necessary to ventilate the manhole. In addition, in such a case, some type of illumination is also necessary inside of the manhole where it is almost always dark. At present, when construction or other work is carried out in a manhole, a lighting-ventilation device which uses an internal combustion engine as a drive source is used. However, in such a conventional lighting-ventilation device, since the noise of the engine is very loud and, in addition, a large amount of harmful components is discharged from the engine, it is necessary to position the engine as far away from the enclosed construction area as possible. To this end, in a conventional lighting-ventilation device, a generator driven by the engine, as well as a generator driven electrical drive motor of the ventilation device, are located at a position far away from the construction area. However, the efficiency of converting the output of the engine to electric power and, then driving the lighting instrument and ventilation device by the electric power, is very low.

In addition to the necessity of ventilation and illumination, mentioned above, in the case where the construction work is carried out when the ambient temperature is very low, as in the cold season, the necessity of heating the inside of the manhole also arises. However, there has not yet been proposed a lighting-ventilation device capable of heating the inside of the manhole.

An object of the present invention is to provide a generator blower for ventilation capable of obtaining a high thermal efficiency, capable of producing electric power for illumination and capable of feeding hot air into a closed construction area in the cold season for heating the construction area in such a way that the blower for ventilation and the generater for illumination are directly driven by an engine, and that the hot air is created by using the heat of the engine cylinder and the exhaust gas, which heat is ineffectively discharged into the atmosphere in a conventional device.

According to the present invention, there is provided a device for generating electric power and creating hot air, comprising: a base frame; an internal combustion engine mounted on said base frame and having an output shaft; a generator mounted on said base frame and having a rotary shaft which is connected to the output shaft of said engine; a blower mounted on said base frame and having therein a suction fan connected to the rotary shaft of said generator, said blower having a hot air inlet and a hot air outlet; duct means enclosing said engine and forming a hot air passage therein, said duct means having a cold air inlet and being connected to the hot air inlet of said blower, and; exhaust passage means arranged across said hot air passage and connected to the atmosphere.

The present invention may be more fully understood from the description of a preferred embodiment of the invention set forth below, together with the accompanying drawings.

DESCRIPTION OF A PREFERRED EMBODIMENT

Figure 1:
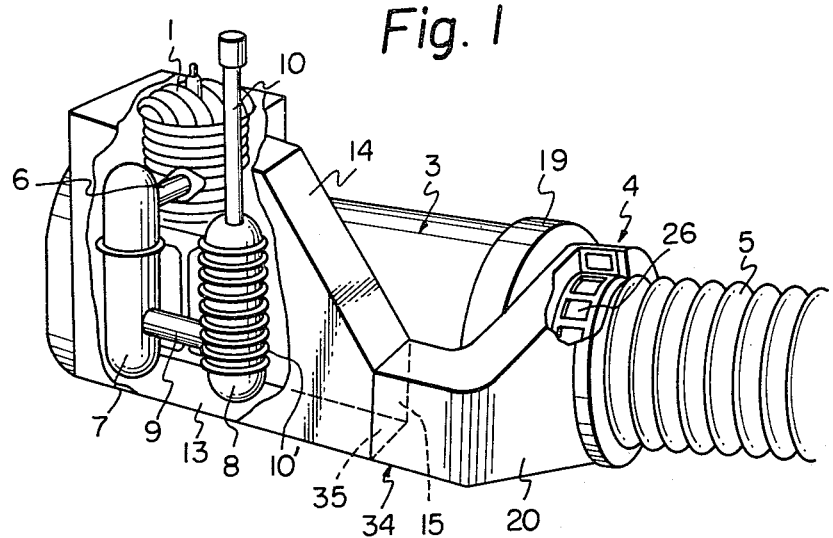
FIG. 1 is a perspective view of a generator blower according to the present invention, with a part of the cover eliminated.

Referring to FIGS. 1 through 5, 1 designates an engine body, 2 a carburetor, 3 a generator having an input shaft 3a directly connected to the output shaft 1a of the engine body 1 and 4 a blower; 5 designates an air discharge pipe, 6 an exhaust pipe connected to the exhaust port (not shown) of the engine body 1, 7 a catalytic converter connected to the exhaust pipe 6 and 8 a heat exchanger forming on its outer wall a plurality of fins 10' and connected to the exhaust gas outlet of the catalytic converter 7; 10 designates a vertical exhaust pipe connected to the exhaust gas outlet of the heat exchanger 8 and 11 a fan for cooling the cylinder of the engine body, which is directly connected to the output shaft of the engine body 1. The engine body 1 and the generator 3 are fixed onto a base plate 12. In this embodiment, instead of directly connecting the input shaft 3a of the generator 3 to the output shaft 1a of the engine body 1, the generator 3 may be constructed so as to be driven by the engine body 1 by means of a belt (not shown). The heat exchanger 8 is formed by a hollow vessel and functions as a muffler. A flat floor plate 13 (FIG. 1) is fixed onto the base plate 12 on one side of the engine body 1, and a cover 14 covering the floor plate 13 and the engine body 1 is secured onto the floor plate 13 and the engine body 1 by means of, for example, bolts (not shown). In addition, the catalytic converter 7 and the thermal exchanger 8 are also covered by this cover 14. The cover 14 has on its rear end an opening 15 and on its forward end an opening 16. This opening 16 is covered by a cover 18 having an air inlet opening 17. This cover 18 comprises a cover portion 18a enclosing the fan 11, and a cover portion 18b extending upwards from the cover portion 18a and serving to guide air sucked in from outside the engine.

Figure 2:
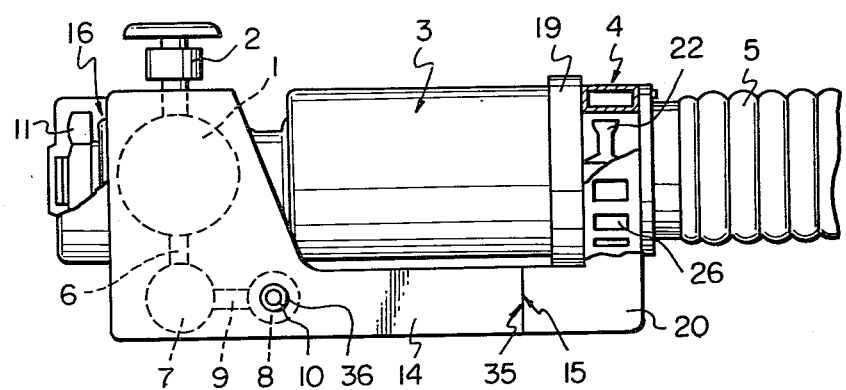
FIG. 2 is a plan view of the generator blower shown in FIG. 1.
Figure 4:
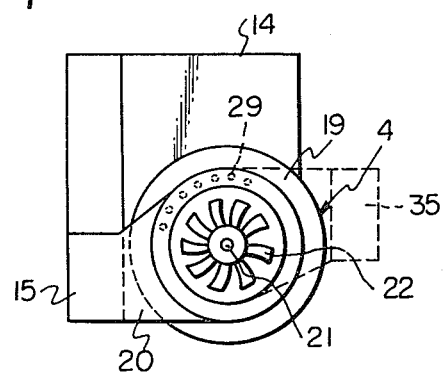
FIG. 4 is a rear view of the generator blower shown in FIG. 1.
Figure 5:
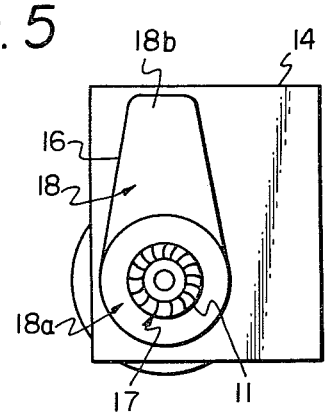
FIG. 5 is a front view of the generator blower shown in FIG. 1.
Figure 6:
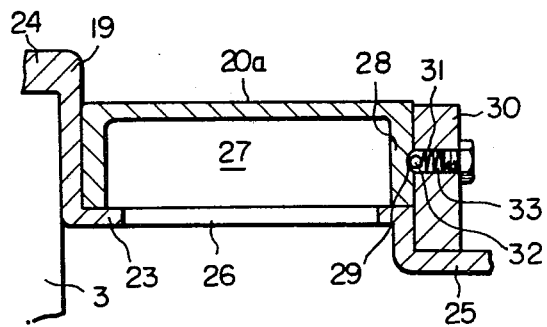
FIG. 6 is an enlarged cross-sectional view of the inside of the generator enclosed by the circle A in FIG. 3.

The blower 4 comprises a hollow casing 19, an L shaped duct 20, as shown in FIG. 2, and a fan 22 fixed onto the rotary shaft of the generator 3 by means of a bolt 21 (FIG. 4). As illustrated in FIG. 6, the casing 19 comprises a central cylindrical portion 23, an increased diameter portion 24 and a reduced diameter portion 25. This casing 19 is fixed onto the generator 3 in such a way that the increased diameter portion 24 is fitted onto the end of the generator 3 and, then, secured onto the generator 3 by means of, for example, bolts (not shown). A plurality of rectangular slits 26 is formed on the central cylindrical portion 23, and the L-shaped duct 20 is swingingly mounted on the outer peripheral surface of the central cylindrical portion 23 so as to enclose the slits 26. As is illustrated in FIGS. 1, 2 and 6, a duct portion 20a of the duct 20, which is arranged to enclose the slits 26, has a U shape in cross-section so that an air flow passage 27 is formed in the inside of the duct portion 20a. As illustrated in FIGS. 4 and 6, the side wall 28 of the duct portion 20a forms on its outer surface a plurality of semi-spherical recesses 29 which are equiangularly spaced from each other, as shown by the broken line in FIG. 4. On the other hand, a hole 31 (FIG. 6) arranged to be able to align with the recesses 29 is formed on an annular member 30 which is secured onto the casing 19 by means of, for example, bolts (not shown). A ball 32 inserted into the hole 31 is always urged onto the side wall 28 due to the spring force of a compression spring 33. Consequently, when the duct 20 is swung around the casing 19 and, then, the ball 32 is fitted into one of the recesses 29, the duct 20 is held in one position by the ball 32. On the other hand, the duct 20 has on its side forward end 34 an opening 35 which can align with the opening 15 of the cover 14. Consequently, when the duct 20 is positioned at a position wherein the opening 35 is aligned with the opening 15, the interior space of the cover 14 is in communication with the interior space of the duct 20. However, when the duct 20 is swung and positioned at a position shown by the broken line in FIG. 4, both the opening 15 of the cover 14 and the opening 35 of the duct 20 are caused to open to the atmosphere.

Figure 3:
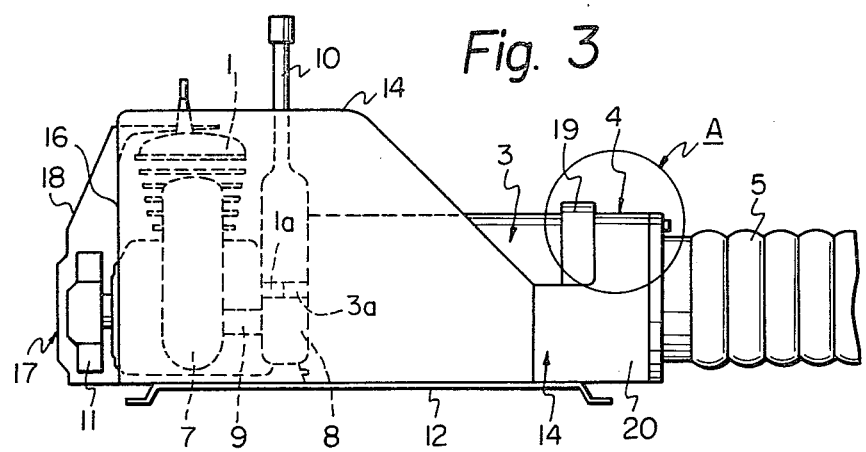
FIG. 3 is a side view of the generator blower shown in FIG. 1.
Figure 7:
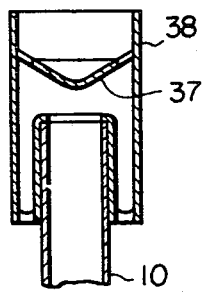
FIG. 7 is an enlarged cross-sectional view of the tip of the exhaust pipe.

As illustrated in FIG. 3, the exhaust pipe 10 extends upwards through a hole 36 (FIG. 2) formed in the cover 14 and, as illustrated in FIG. 7, a shielding cap 38 having an inverted conical shape member 37 is fitted onto the tip of the exhaust pipe 10 for preventing rain water from entering into the exhaust pipe 10.

In operation, the exhaust gas discharged from the engine body 1 is fed into the catalytic converter 7 via the exhaust pipe 6. The unburned components contained in the exhaust gas are oxidized in the catalytic ocnverter 7 and, then, the exhaust gas thus purified is fed into the heat exchanger 8 via the exhaust pipe 9. After this, the exhaust gas is discharged into the atmosphere via the exhaust pipe 10. The oxidization reaction in the catalytic converter 7 is an exothermic reaction and, as a result, exhaust gas having a considerably high temperature is fed into the heat exchanger 8.

In addition, in operation, the fans 11 and 22 rotate together with the rotary shaft of the generator 3. Consequently, ambient air, which is sucked into the cover 18 from the air inlet 17, due to the suction force caused by the fan 11, is guided to the surrounding of the cylinder block of the engine body 1, whereby the cylinder block is cooled by the ambient air. At this time, the temperature of the air is increased by absorbing the heat from the cylinder block. After this, the air having a high temperature passes around the catalytic converter 7 and the heat exchanger 8. As mentioned previously, the temperature of the exhaust gas fed into the heat exchanger 8 is considerably high. Therefore, the air flowing in the cover 14 is considerably heated when passing around the heat exchanger 8. Then, the hot air having a high temperature is fed into, for example, the construction area in a manhole from the air discharge pipe 5 via the air flow passage 27 in the duct 20 and via the slit 26 due to the suction force caused by the fan 22, and as a result, the heating operation and the ventilating of the manhole are carried out at the same time due to the supply of the hot air.

In the case where the ambient temperature is relatively high, it is not necessary to heat the inside of the manhole, and it is necessary only to ventilate the manhole. In this case, by swinging the duct 20 and positioning it at a position shown by the broken line in FIG. 4, the hot air flowing in the cover 14 is discharged into the atmosphere from the opening 15 of the duct 20. On the other hand, the ambient air is directly sucked into the duct 20 from the atmosphere via the opening 35 of the duct 20 and fed into the construction area via the air discharge pipe 5, so that ventilation of the manhole is carried out. Particularly when the ambient temperature is considerably high, as in the hot season, in order to minimize the amount of heat issued from the engine body 1 and entering into the duct 20 from the opening 35 thereof, it is preferable that the opening 35 of the duct 20 be rotated and positioned at a position opposite to the opening 15 of the cover 14 with respect to the fan 22 as shown by the broken line in FIG. 4. In addition, in order to completely prevent the heat issued from the engine body 1 from entering into the duct 20, an air suction pipe having a shape which is similar to that of the air discharging pipe 5 may be connected to the opening 35 of the duct 20, so that the air inlet opening of the air suction pipe can be arranged at a position far away from the engine body 1. Furthermore, by positioning the duct 20 at a position wherein the opening 35 of the duct 20 partially intersects the opening 15 of the cover 14, it is possible to adjust at will the amount of the hot air sucked into the duct 20 and the amount of the air directly sucked from the atmosphere into the duct 20, whereby the temperature of the hot air flowing in the air discharging pipe 5 can be adjusted at will.

In a generator blower according to the present invention, it is necessary to arrange the exhaust gas outlet of the exhaust pipe 10 at a position as far away from the air inlet 17 of the cover 18 as possible in the case wherein the opening 35 of the duct 20 is arranged so that it is aligned with the opening 15 of the cover 14, as illustrated in FIG. 4, and in addition, it is necessary to arrange the exhaust gas outlet of the exhaust pipe 10 at a position away from the opening 35 of the duct 20 in the case wherein the air is directly sucked into the duct 20 from the atmosphere via the opening 35 of the duct 20, as shown by the broken line in FIG. 4. By arranging the exhaust gas outlet of the exhaust pipe 10 as mentioned above, it is possible to prevent the exhaust gas from being sucked into the duct 20 from the air inlet 17 of the cover 18 or the opening 35 of the duct 20. In addition, in the case where the exhaust pipe 10 is vertically arranged, as illustrated in FIGS. 1 and 3, since the exhaust gas discharged from the exhaust pipe 10 into the atmosphere flows upwards, there is no danger that the exhaust gas will be sucked into the duct 20 from the air inlet 17 of the cover 18 and the opening 35 of the duct 20, and then fed into the construction area via the air discharging pipe 5.

As an internal combustion engine used for driving a generator blower according to the present invention, an active thermoatmosphere combustion 2 cycle engine disclosed in U.S. Pat. No. 4,180,029 can be used. This 2 cycle engine has various advantages in that the noise of the engine is quite low, the fuel consumption is considerably improved as compared with that of a conventional 2 cycle engine and the amount of harmful components in the exhaust gas is extremely small. Consequently, in the case where the active thermoatmosphere combustion 2 cycle engine is adopted, it is possible to almost completely eliminate the harmful components in the exhaust gas by merely mounting the catalytic converter 7 of a small size to the engine body 1 as illustrated in FIG. 1. Consequently, in this case, even if a generator blower according to the present invention is used in the vicinity of the construction area, there is no danger that the noise of the engine will bother the workers. In addition, even if a small amount of the exhaust gas is sucked from the air inlet 17 due to a variation in the direction of the wind, and the exhaust gas thus sucked is fed into the construction area via the air discharging pipe 5, since the harmful components in the exhaust gas are almost completely eliminated, there is no danger that the exhaust gas will injure the workers.

According to the present invention, since it is possible to effectively utilize the heat of the exhaust gas, the temperature of which is increased by the heat of the engine and due to the oxidation of unburned components in the catalytic converter, and since the generator is directly driven by an engine instead of driving the electrical motor of a ventilation device by the electric power of a generator as in a conventional lighting ventilation device, the thermal efficiency of a generator blower can be considerably improved over that of the conventional apparatus.

While the invention has been described by reference to a specific embodiment chosen for purposes of illustrations, it should be apparent that numerous modifications could be made thereto by those skilled in the art without departing from the spirit and scope of the invention.

What is claimed is:
1. A generator blower comprising:
   a base frame;
   an internal combustion engine mounted on said base frame and having an output shaft;
   a generator mounted on said base frame and having an input shaft connected to the output shaft of said engine;
   a blower mounted on said base frame and driven by said engine;
   duct means enclosing said engine and defining therein a hot air passage which has a cold air inlet and a hot air outlet;
   exhaust passage means arranged across said hot air passage and connected to the exterior of said duct means;
   a movable duct arranged to enclose said blower, said movable duct having an air outlet and an air inlet which can be aligned with the hot air outlet of said hot air passage and moved from a position wherein the air inlet of said movable duct is aligned with the hot air outlet of said hot air passage to a position wherein the air inlet of said movable duct directly opens into the atmosphere; and
   said blower comprises a cylindrical casing enclosing a suction fan and forming thereon a plurality of openings, said movable duct being swingingly mounted on the cylindrical casing of said blower, said blower further comprising means for securing said movable duct to said blower in one position.

2. A generator blower as claimed in claim 1, wherein said engine comprises a cooling fan connected to said output shaft of said engine and arranged in said cold air inlet.

3. A generator blower as claimed in claim 1, wherein said exhaust passage means comprises a catalytic converter arranged in said hot air passage.

4. A generator blower as claimed in claim 3, wherein said exhaust passage means comprises a heat exchanger arranged in said hot air passage and connected to an exhaust outlet 5. A generator blower as claimed in claim 1, wherein said securing means comprises a plurality of recesses formed on said movable duct, and a ball resiliently mounted on said blower and arranged to be engageable with said recesses.

6. A generator blower as claimed in claim 1, wherein said exhaust passage means has an open end arranged in the atmosphere at a position remote from both said cold air inlet and said air inlet of said movable duct which is positioned at a position wherein said air inlet directly opens into the atmosphere.

7. A generator blower as claimed in claim 6, wherein the open end of said exhaust passage means has a shielding cap for preventing rain water from entering into said exhaust passage means.

* * * * *